(12) United States Patent
Kim

(10) Patent No.: US 10,056,747 B2
(45) Date of Patent: Aug. 21, 2018

(54) HOUSEHOLD DISTRIBUTION BOX FOR FORCIBLE POWER INTERRUPTION AND FORCIBLE POWER INTERRUPTION SYSTEM

(71) Applicant: Mirae Kim, Seoul (KR)

(72) Inventor: Miyeon Kim, Jeju-si (KR)

(73) Assignee: Mirae Kim, Seoul (KR)

( * ) Notice: Subject to any disclaimer, the term of this patent is extended or adjusted under 35 U.S.C. 154(b) by 0 days.

(21) Appl. No.: 15/304,863

(22) PCT Filed: Apr. 20, 2015

(86) PCT No.: PCT/KR2015/003921
§ 371 (c)(1),
(2) Date: Oct. 18, 2016

(87) PCT Pub. No.: WO2015/163652
PCT Pub. Date: Oct. 29, 2015

(65) Prior Publication Data
US 2017/0187172 A1    Jun. 29, 2017

(30) Foreign Application Priority Data

Apr. 25, 2014 (KR) .................. 10-2014-0050276

(51) Int. Cl.
*H02G 3/08* (2006.01)
*H01H 9/54* (2006.01)
*H02J 9/06* (2006.01)

(52) U.S. Cl.
CPC .............. *H02G 3/081* (2013.01); *H01H 9/54* (2013.01); *H02J 9/061* (2013.01)

(58) Field of Classification Search
CPC ........................................................ H02J 9/061
See application file for complete search history.

(56) References Cited

U.S. PATENT DOCUMENTS 7,680,561 B2 *   3/2010   Rodgers .................... H02J 3/14
                                                                       340/12.32
7,796,025 B2 *   9/2010   Berkman ................. H04B 3/54
                                                                       340/12.37
(Continued)

FOREIGN PATENT DOCUMENTS

JP      08-149053 A     6/1996
JP    2010-028563 A     2/2010
(Continued)

OTHER PUBLICATIONS

International Search Report for PCT/KR2015/003921 dated Jun. 29, 2015 from Korean Intellectual Property Office.

*Primary Examiner* — Robert J Hoffberg
(74) *Attorney, Agent, or Firm* — Revolution IP, PLLC

(57) ABSTRACT

A household distribution box comprises a distribution box case; two service lines introduced from a transformer into the distribution box case of a consumer; three main lines installed in the distribution box case and provided with two lines and a second service line; two sub-lines installed in the distribution box case and formed by branching the second service line among the main lines into two lines; a first circuit breaker installed in the distribution box case; a second circuit breaker installed in the distribution box case; and a controller connected to the first circuit breaker.

8 Claims, 2 Drawing Sheets

(56) References Cited

U.S. PATENT DOCUMENTS

| | | | | |
|---|---|---|---|---|
| 7,813,842 | B2* | 10/2010 | Iwamura | H04B 3/54 307/31 |
| 8,560,138 | B2* | 10/2013 | Iwamura | H04B 3/54 307/31 |
| 8,666,520 | B2* | 3/2014 | Kucinskas | H02J 3/14 700/86 |
| 9,595,825 | B2* | 3/2017 | Curt | G07F 15/003 |
| 9,787,095 | B2* | 10/2017 | Ragaini | H02J 3/14 |
| 2005/0116814 | A1* | 6/2005 | Rodgers | H02J 3/14 340/538 |
| 2007/0010916 | A1* | 1/2007 | Rodgers | H02J 3/14 700/295 |
| 2014/0032005 | A1* | 1/2014 | Iwamura | H04B 3/54 700/295 |
| 2015/0271062 | A1* | 9/2015 | Vijayasankar | H04L 45/26 370/252 |
| 2016/0231721 | A1* | 8/2016 | Lakshmanan | G05B 19/042 |
| 2016/0358722 | A1* | 12/2016 | Lakshmanan | G05B 15/02 |
| 2017/0140602 | A1* | 5/2017 | Curt | G07F 15/003 |

FOREIGN PATENT DOCUMENTS

| | | |
|---|---|---|
| JP | 2014-039335 A | 2/2014 |
| KR | 10-2007-0016715 A | 2/2007 |
| KR | 10-2013-0125184 A | 11/2013 |
| KR | 10-1375746 B1 | 3/2014 |

* cited by examiner

[FIG. 1]
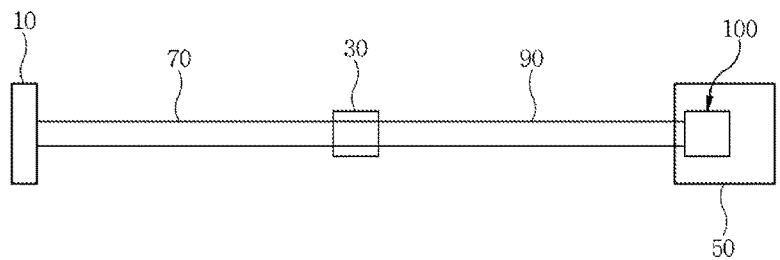
[FIG. 2]
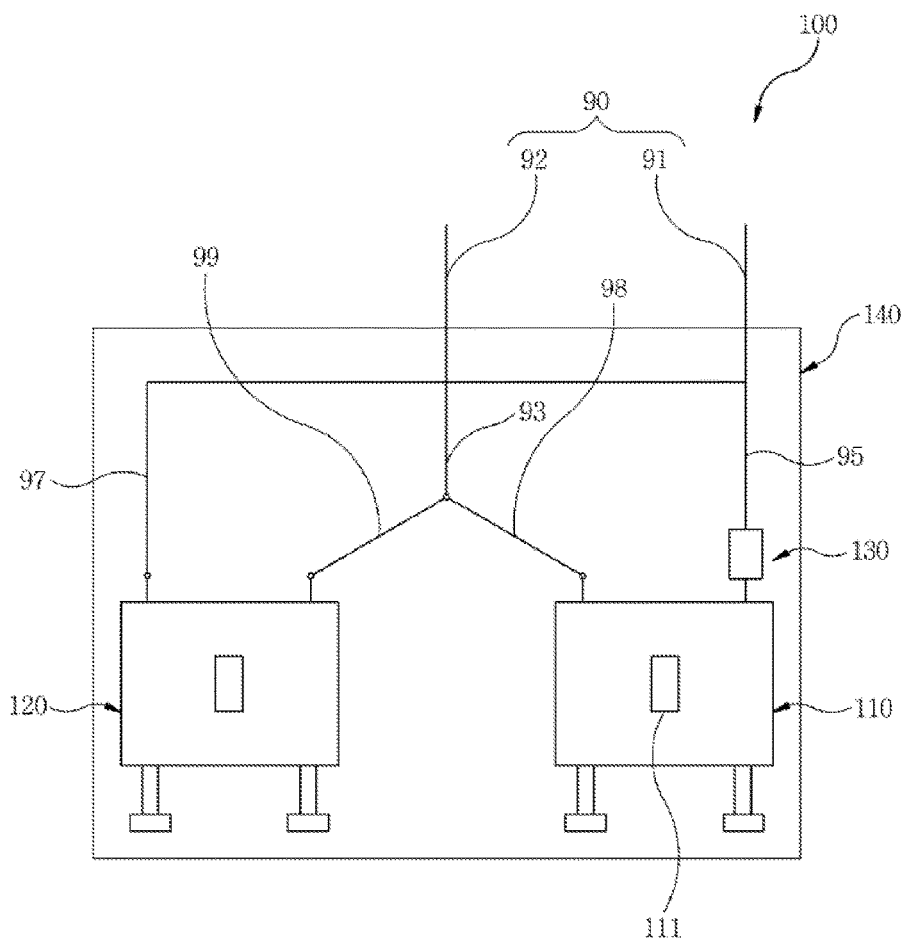

[FIG. 3]
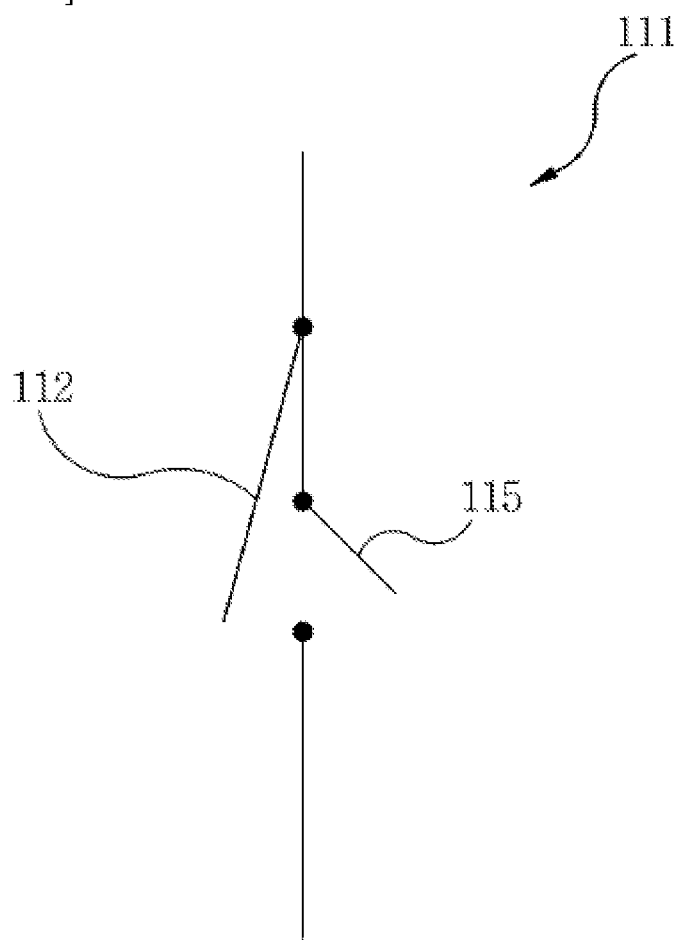

HOUSEHOLD DISTRIBUTION BOX FOR FORCIBLE POWER INTERRUPTION AND FORCIBLE POWER INTERRUPTION SYSTEM

CROSS REFERENCE TO PRIOR APPLICATIONS

This application is a National Stage Application of PCT International Patent Application No. PCT/KR2015/003921 filed on Apr. 20, 2015, under 35 U.S.C. § 371, which claims priority to Korean Patent Application No. 10-2014-0050276 filed on Apr. 25, 2014, which are all hereby incorporated by reference in their entirety.

TECHNICAL FIELD

The present invention relates to a household distribution box and a forcible power interruption system, and more particularly, to a household distribution box and a forcible power interruption system which allow power to be interrupted using power line communication and an application.

BACKGROUND ART

A blackout refers to a state or a phenomenon in which all power systems stop due to lack of electricity. A blackout generally refers to a large scale power outage situation and a case in which a power outage occurs everywhere in a certain region.

In South Korea, an unprecedented power outage situation suddenly occurred on Sep. 15, 2011 in the whole region of Gangnam and Yeouido, throughout the country including Gyeonggi, Gangwon, Chungcheong, and the like, excluding Jeju. The power outage situation started at 3:10 p.m. on that day and was normalized at 7:56 p.m. after continuing for five hours, and a power outage scale was a maximum of 1.62 million sites nationally at one time, and the identified amount of damage was 610 billion won.

Accordingly, a system with which power may be effectively controlled for preventing further damage from occurring to industrial facilities, medical facilities, and general homes due to a blackout is required.

Recently, technologies have been actively developed for methods by which power is saved by interrupting standby power and reducing unnecessarily wasted power among methods by which power is effectively controlled.

Standby power refers to a micro power of about one to five W per hour applied to power consuming products, such as refrigerators, electric fans, electric washers, and television sets, due to a current of a plug socket flowing through a plug plugged into an power outlet even when an power switch of the power consuming product is turned off as long as the plug is not separated from the power outlet.

According to statistics, it is known that power loss corresponding to several hundreds of billion won per year occurs due to a wasted micro current.

Generally, an on and off switch may be installed at a multi tap for interrupting a current supply.

However, when a number of power consuming products are connected to one multi tap, there is a problem of aesthetics being spoiled due to complex wiring, and efficiency is lowered due to difficulty in collectively interrupting a current supply.

In addition, a smart grid has been discussed as a method for effectively controlling power.

The smart grid refers to a technology with which energy efficiency is optimized by applying information technology to a conventional one way power grid including a step of power generation and power transmission and a step of power distribution and power sales, and bilaterally exchanging information between an electricity supplier and consumers. The smart grid connects a power plant and power transmission and distribution facilities, and consumers through an information network, and efficiently operates a power system using bilaterally shared information.

However, a communication security problem has become an important issue according to necessity of an additional communication system, and there is a problem of a receiving device cost and a consumer communication fee.

PRIOR ART DOCUMENT

Patent Document

Korea Patent Registration No. 10-1375746 (Mar. 12, 2014)

DISCLOSURE

Technical Problem

The present invention is directed to providing a household distribution box and forcible power interruption system capable of efficiently controlling overall power of a corresponding region using power line communication and reducing a communication fee because an existing power line is used.

The present invention is also directed to providing a household distribution box and forcible power interruption system capable of preventing damage to industrial facilities, medical facilities, and homes because a circuit breaker for a regular power source is separated from a circuit breaker for forcible interruption and the circuit breaker for forcible interruption is controlled by the household distribution box and forcible power interruption system.

Technical Solution

One aspect of the present invention provides a household distribution box including: a distribution box case; two service lines introduced from a transformer into the distribution box case of a consumer; three main lines installed in the distribution box case and provided with two lines, which are formed by branching a first service line of the service lines into two lines, and a second service line; two sub-lines installed in the distribution box case and formed by branching the second service line among the main lines into two lines; a first circuit breaker installed in the distribution box case, connected to a first main line among the main lines and a first sub-line of the sub-lines, and configured to maintain or stop supply of power supplied through the first main line and the first sub-line; a second circuit breaker installed in the distribution box case, connected to a second main line among the main lines and a second sub-line of the sub-lines, and configured to maintain or stop supply of power supplied through the second main line and the second sub-line; and a controller connected to the first circuit breaker and configured to control an operation of the first circuit breaker through power line communication.

The controller may operate the first circuit breaker using power line communication with a substation and interrupt power.

The controller may operate the first circuit breaker using power line communication with a terminal and interrupt power.

The controller may perform the power line communication with the terminal including an application which allows the power line communication to be performed.

The first circuit breaker may be for forcible interruption and the second circuit breaker may be for interruption of a regular power source.

The first circuit breaker may include a switch configured to interrupt power or standby power supplied through the first main line and the first sub-line.

The switch may include a first switch configured to interrupt the power in response to a signal of a substation, and a second switch configured to interrupt the standby power in response to a signal of a terminal.

Another aspect of the present invention provides a forcible power interruption system including: a substation configured to supply power to a consumer and perform power line communication; a transformer configured to receive power supplied by the substation, transform a voltage of the power to a general working voltage, and supply the power having the general working voltage to the consumer; and a household distribution box configured to receive the power supplied from the transformer and perform power line communication with the substation, wherein the household distribution box includes: a distribution box case; two service lines introduced from the transformer to the distribution box case of the consumer; three main lines installed in the distribution box case and provided with two lines, which are formed by branching a first service line of the service lines, and a second service line; two sub-lines installed in the distribution box case and formed by branching the second service line among the main lines into two lines; a first circuit breaker installed in the distribution box case, connected to a first main line among the main lines and a first sub-line of the sub-lines, and configured to maintain or stop supply of power supplied through the first main line and the first sub-line; a second circuit breaker installed in the distribution box case, connected to a second main line among the main lines and a second sub-line of the sub-lines, and configured to maintain or stop supply of power supplied through the second main line and the second sub-line; and a controller connected to the first circuit breaker and configured to control an operation of the first circuit breaker through power line communication.

The controller may operate the first circuit breaker using power line communication with the substation and interrupt power.

Advantageous Effects

According to the present invention, because three main lines are formed by being branched from one of service lines, and a circuit breaker is separated into a circuit breaker for regular power and a circuit breaker for forcible interruption, overall power of a region including houses can be efficiently managed.

In addition, an additional communication fee is unnecessary because power line communication is used, and standby power is interrupted and wasted power is reduced by controlling a circuit breaker for forcible interruption through communication with a substation or a terminal, and thus a blackout can be prevented.

DESCRIPTION OF DRAWINGS

FIG. 1 is a view illustrating a forcible power interruption system according to an embodiment of the present invention.

FIG. 2 is a view illustrating a structure of a household distribution box shown in FIG. 1.

FIG. 3 is a view illustrating a structure of a switch shown in FIG. 2.

MODES OF THE INVENTION

The following descriptions will be focused on configurations necessary for understanding embodiments of the invention. Therefore, descriptions of other configurations that might obscure the gist of the invention will be omitted.

Terms and words used in this specification and claims are not to be interpreted as limited to commonly used meanings or meanings in dictionaries and should be interpreted with meanings and concepts which are consistent with the technological scope of the invention based on the principle that the inventor has appropriately defined concepts of terms in order to describe the invention in the best way. Therefore, since the embodiments described in this specification and configurations illustrated in the drawings are only exemplary embodiments and do not represent the overall technological scope of the invention, it should be understood that the invention covers various equivalents, modifications, and substitutions at the time of filing of this application.

Hereinafter, the present invention will be described in more detail with reference to the accompanying drawings.

FIG. 1 is a view illustrating a forcible power interruption system according to an embodiment of the present invention, and FIG. 2 is a view illustrating a structure of a household distribution box shown in FIG. 1.

Referring to FIGS. 1 and 2, a forcible power interruption system includes a substation 10 configured to supply power to a consumer 50 and perform power line communication, a transformer 30 configured to receive power supplied from the substation 10, transform a voltage of the power to a general working voltage, and supply the power having the general working voltage to the consumer 50, and a household distribution box 100 configured to receive the power supplied from the transformer 30 and perform power line communication with the substation 10.

The forcible power interruption system according to the present invention may further include a controller 130 configured to interrupt power by operating a first circuit breaker 110 using the substation 10 and power line communication.

The substation 10 is a facility installed for transforming a voltage or a current in a process in which power generated from a power plant is transmitted to the consumer 50 through a transmission line 70 or a distribution line, and the substation 10 may be a step-up or step-down substation, but is not limited thereto. In addition, the substation 10 may perform a function of managing power of all homes by determining a supply and demand situation of power of an entire region where the substation 10 is.

The transformer 30 refers to a transformer for distribution, is installed on an electric pole, drops a high voltage into a lower voltage, and supplies power which has the drooped voltage to the consumer 50.

The consumer 50 is a customer who buys electricity for using the electricity for him-or-herself, and is a main agent, such as a home, an industrial facility, a medical facility, or the like, but is not limited thereto.

The household distribution box 100, in which service lines 90 introduced from the electric transformer 30 to the consumer 50 are branched, controls power, and interrupts power from the substation or a terminal through power line communication.

The household distribution box 100 includes a distribution box case 140, two service lines 90 introduced from the transformer 30 into the distribution box case 140 of the consumer 50, three main lines 93, 95, and 97 installed in the distribution box case 140 and provided with two lines formed by branching a first service line 91 of the service lines 90 into two lines and a second service line 92, two sub-lines 98 and 99 installed in the distribution box case 140 and formed by branching the main line 93 of the main lines 93, 95, and 97 into two lines, a first circuit breaker 110 installed in the distribution box case 140, connected to the first main line 95 among the main lines 93, 95, and 97 and the first sub-line 98 of the sub-lines 98 and 99, and configured to maintain or stop supply of power through the first main line 95 and the first sub-line 98, a second circuit breaker 120 installed in the distribution box case 140, connected to the second main line 97 among the main lines 93, 95, and 97 and the second sub-line 99 of the sub-lines 98 and 99, and configured to maintain or stop supply of power through the second main line 97 and the second sub-line 99, and the controller 130 attached to the first circuit breaker 110 and configured to control an operation of the first circuit breaker 110 through power line communication.

When the service lines 90 are introduced into a structure in a region in which distribution lines are required, the service lines 90 are electrical lines which connect a main line of the distribution lines with a power receiving point in a facility of the consumer 50 by passing through an inner wall of the structure, and the like. The service lines 90 include cables or aerial lines, but are not limited thereto.

Three main lines 93, 95, and 97 are formed by branching the first service line 91 of the two service lines 90 introduced from the transformer 30 to the distribution box case 140 of the consumer 50, the first main line 95 among the main lines 93, 95, and 97 is connected to the circuit breaker for forcible interruption 110, and thus power may be interrupted by operating the circuit breaker 110 using the controller 130 through power line communication. Accordingly, power can be efficiently controlled because power of a corresponding region is collectively interrupted.

The circuit breakers 110 and 120 are devices which maintain or stop supply of a current and maintain safety by cutting off a circuit in an abnormal state such as overload, short circuit, etc. The circuit breakers 110 and 120 may be manually or electrically operated, and may automatically cut off an electrical line when an abnormal case occurs. The circuit breakers 110 and 120 include a hydraulic circuit breaker, a vacuum circuit breaker, an air circuit breaker, and a magnetic circuit breaker, but are not limited thereto.

Use of the circuit breakers 110 and 120 according to the present invention is classified into a forcible interruption circuit breaker corresponding to the first circuit breaker 110 and a regular power circuit breaker corresponding to the second circuit breaker 120.

Power applied to the circuit breaker for regular power 120 is applied to an emergency light, a refrigerator, and a boiled-rice container, and is also applied to electronic products which need a regular power source.

Power applied to the circuit breaker for forcible interruption 110 is applied to electronic products to which damage does not occur or is small even when power is not forcibly supplied rather than the electronic products connected to the circuit breaker for regular power 120.

Because the use of the circuit breakers 110 and 120 is separated, a blackout is prevented by operating the circuit breaker for forcible interruption 110 and interrupting electrical power when it is determined that there is a possibility of a blackout occurring, and thus damage which occurs to industrial facilities, medical facilities, a general home, and the like can be prevented.

FIG. 3 is a view illustrating a structure of a switch shown in FIG. 2. Referring to FIG. 3, a switch 111 is a device used for connection or disconnection of an electrical circuit, may be included in the first circuit breaker 110, and may interrupt power or standby power supplied through the first main line 95 and the first sub-line 98. The switch 111 may be formed in a dual structure, a first switch 112 may interrupt power in response to a signal of the substation, and a second switch 115 may interrupt standby power in response to a signal of a terminal.

The controller 130 is a device which controls the switch 111 to operate the circuit breaker, is connected to the first circuit breaker 110, and is operated through power line communication. The controller 130 may perform power line communication with the substation 10 or a terminal. The substation 10 may perform communication through which a supply and demand situation of power of an entire region, where the substation is, is determined and power of all homes is interrupted, and the terminal is a terminal including an application capable of performing power line communication and performing communication through which standby power is interrupted.

The forcible power interruption system may be operated by using the household distribution box 100 capable of performing power line communication as will be described below.

For example, power transmitted from the substation 10 is first voltage-dropped through the transformer 30 and supplied to the consumer 50.

The substation 10 determines a supply and demand situation of power of an entire region where the substation 10 is, and transmits an interruption command of power to the controller 130 through power line communication when supply of the power is lowered to a reference level at which there is a possibility of a blackout occurring. The controller 130 receives the command and interrupts power supplied through the first main line 95 by transmitting a signal to the first switch 112.

For another example, power transmitted from the substation 10 is first voltage-dropped through the transformer 30 and supplied to the consumer 50.

A terminal transmits an interruption command of standby power to the controller 130 in response to an input of a user through an application capable of performing power line communication. The controller 130 receives the command and interrupts power supplied to the first main line 95 by transmitting a signal to the second switch 115.

Power line communication refers to a technology with which voice and data carried in a high frequency signal is communicated using a power line as a power supplying medium. Through power line communication, even when an additional communication device is not installed, the controller 130 may communicate with the substation 10 or a terminal. Accordingly, a smart grid can be implemented, and a burden of installation of an additional communication device and a communication fee of a consumer can be decreased.

According to the above detail description, because the three main lines 93, 95, and 97 are formed by being branched from one of the service lines 90, and the circuit breakers 110 and 120 are controlled while being separated into a circuit breaker for regular power source and a circuit breaker for forcible interruption, overall power of a corresponding region can be efficiently managed. In addition, an additional communication device is unnecessary because power line communication is used, and standby power is interrupted and wasted power is decreased by controlling the circuit breaker for forcible interruption 110 through communication with the terminal, and thus a blackout can be prevented.

The embodiments disclosed in this specification and drawings are only examples to help in understanding the invention, and the invention is not limited thereto. It should be clear to those skilled in the art that various modifications based on the technological scope of the invention in addition to the embodiments disclosed herein can be made.

The invention claimed is:

1. A household distribution box comprising:
   a distribution box case;
   first and second service lines introduced from a transformer into the distribution box case of a consumer;
   first, second and third main lines installed in the distribution box case, the first and second main lines being formed by branching the first service line into two lines, the third main line being connected to the second service line;
   first and second sub-lines installed in the distribution box case and formed by branching the third main line into two lines;
   a first circuit breaker installed in the distribution box case, connected to the first main line and the first sub-line, and configured to maintain or stop supply of regular power supplied from the transformer through the first main line and the first sub-line, the first circuit breaker including a first switch and a second switch, the first switch configured to interrupt the regular power supplied through the first main line and the first sub-line in response to a signal of a substation, the second switch configured to interrupt standby power supplied through the first main line and the first sub-line in response to a signal of a terminal;
   a second circuit breaker installed in the distribution box case, connected to the second main line and the second sub-line, and configured to maintain or stop supply of the regular power supplied from the transformer through the second main line and the second sub-line; and
   a controller connected to the first circuit breaker and configured to control an operation of the first circuit breaker through power line communication.

2. The household distribution box of claim 1, wherein the controller operates the first circuit breaker using the power line communication with a substation and interrupts the regular power.

3. The household distribution box of claim 1, wherein the controller operates the first circuit breaker using the power line communication with a terminal and interrupts the regular power.

4. The household distribution box of claim 3, wherein the controller performs the power line communication with the terminal including an application which allows the power line communication to be performed.

5. The household distribution box of claim 1, wherein the first circuit breaker is for forcible interruption and the second circuit breaker is for interruption of the regular power supplied by a regular power source.

6. A forcible power interruption system comprising:
   a substation configured to supply regular power to a consumer and perform power line communication;
   a transformer configured to receive the regular power supplied from the substation, transform a voltage of the regular power to a general working voltage, and supply the regular power having the general working voltage to the consumer; and
   a household distribution box configured to receive the regular power supplied from the transformer and perform the power line communication with the substation,
   wherein the household distribution box includes:
   a distribution box case;
   first and second service lines introduced from the transformer to the distribution box case of the consumer;
   first, second and third main lines installed in the distribution box case, the first and second main lines being formed by branching the first service line into two lines, the third main line being connected to the second service line;
   first and second sub-lines installed in the distribution box case and formed by branching the third main line into two lines;
   a first circuit breaker installed in the distribution box case, connected to the first main line and the first sub-line, and configured to maintain or stop supply of the regular power supplied from the transformer through the first main line and the first sub-line, the first circuit breaker including a first switch and a second switch, the first switch configured to interrupt the regular power supplied through the first main line and the first sub-line in response to a signal of the substation, the second switch configured to interrupt standby power supplied through the first main line and the first sub-line in response to a signal of a terminal;
   a second circuit breaker installed in the distribution box case, connected to the second main line and the second sub-line, and configured to maintain or stop supply of the regular power supplied from the transformer through the second main line and the second sub-line; and
   a controller connected to the first circuit breaker and configured to control an operation of the first circuit breaker through the power line communication.

7. The forcible power interruption system of claim 6, wherein the controller operates the first circuit breaker using the power line communication with the substation and interrupts the regular power.

8. The forcible power interruption system of claim 6, wherein the controller is installed between the first main line and the first circuit breaker.

* * * * *